(12) United States Patent
Yamazaki

(10) Patent No.: US 9,085,861 B2
(45) Date of Patent: Jul. 21, 2015

(54) SNOW REMOVAL MACHINE

(71) Applicant: HONDA MOTOR CO., LTD., Tokyo (JP)

(72) Inventor: Nobuo Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/150,917

(22) Filed: Jan. 9, 2014

(65) Prior Publication Data

US 2014/0202046 A1 Jul. 24, 2014

(30) Foreign Application Priority Data

Jan. 23, 2013 (JP) ................. 2013-010528

(51) Int. Cl.
*E01H 5/09* (2006.01)

(52) U.S. Cl.
CPC ..................... *E01H 5/098* (2013.01)

(58) Field of Classification Search
CPC ............... E01H 5/00; E01H 5/04; E01H 5/09; E01H 5/098
USPC ................... 37/245, 246, 248, 348
See application file for complete search history.

(56) References Cited

U.S. PATENT DOCUMENTS

| | | | |
|---|---|---|---|
| 6,116,369 A | 9/2000 | King et al. | |
| 7,100,312 B2 * | 9/2006 | Wakitani et al. | 37/246 |
| 7,116,065 B2 * | 10/2006 | Wakitani et al. | 318/67 |
| 7,305,778 B2 * | 12/2007 | Wakitani et al. | 37/245 |
| 7,328,762 B2 * | 2/2008 | Kanke et al. | 180/19.3 |
| 7,343,994 B2 * | 3/2008 | Wakitani et al. | 180/65.265 |
| 7,673,402 B2 * | 3/2010 | Wakitani et al. | 37/348 |
| 2007/0022634 A1 | 2/2007 | Yamazaki et al. | |

FOREIGN PATENT DOCUMENTS

JP 2007-56445 A 3/2007

OTHER PUBLICATIONS

Extended European Search Report dated Jun. 2, 2014, European Patent Application No. 14151418.2 (6 pages).

* cited by examiner

*Primary Examiner* — Jamie L McGowan

(74) *Attorney, Agent, or Firm* — Westerman, Hattori, Daniels & Adrian, LLP

(57) ABSTRACT

A snow removal machine, in which an engine drives an auger and a blower, includes a mode switching operation section for selecting and switching to any one of a plurality of control modes differing from each other in engine output control characteristic; and a control section for controlling the engine by executing any one of the plurality of control modes in accordance with an operation signal output from the mode switching operation section. The control section makes a determination as to whether an operating state of the engine in the currently-executed control mode is in a recommended operating range preset on the basis of at least a rotating speed and degree of throttle opening of the engine, and instructs a display section to display a result of the determination.

3 Claims, 8 Drawing Sheets

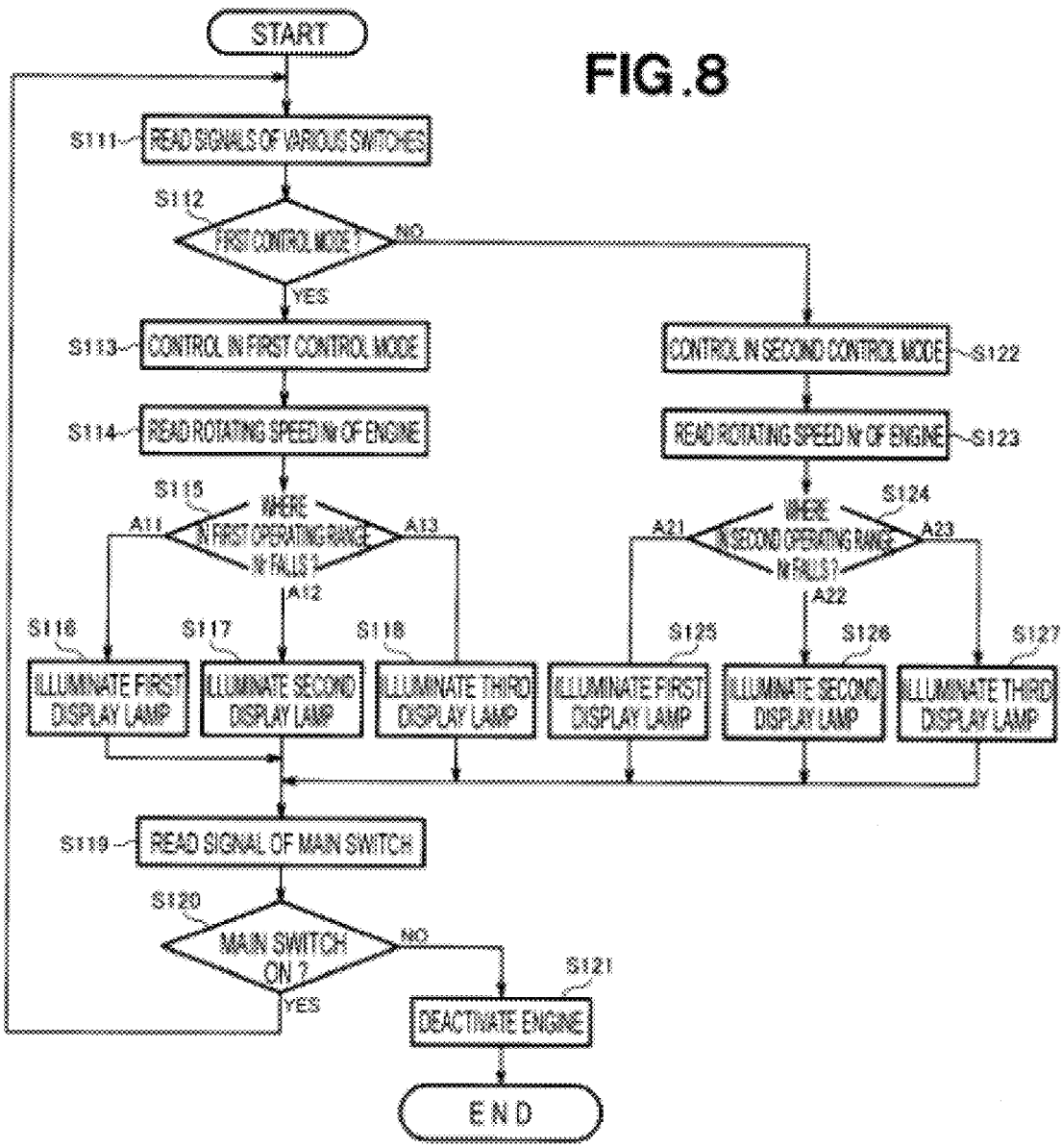

SNOW REMOVAL MACHINE

TECHNICAL FIELD

The present disclosure relates to an improved technique of self-propelled auger-type snow removal machines.

BACKGROUND

Among the conventionally-known self-propelled auger-type snow removal machines are ones in which an engine drives an auger and a blower that blows away snow, gathered by the auger, to around the machine through a shooter. Japanese Patent Application Laid-open Publication No. 2007-056445 (hereinafter referred to as "the relevant prior art document") discloses such a snow removal machine and particularly a technique for switching between a plurality of engine control modes.

The snow removal machine disclosed in the relevant prior art document is constructed in such a manner that a desired one of a plurality of snow removal modes (control modes) is selected via a mode setting switch and that rotation control of the engine is performed in the selected snow removal mode (control mode). In the selected snow removal mode, the engine can be controlled in accordance with a traveling speed corresponding to an operated amount of a travel seed lever.

In each of the control modes, it may sometimes be preferable, in order to achieve detailed snow removal work, that control of a snow removal work section, comprising the auger and the blower, be separated from a traveling speed of the snow removal machine so that a human operator can adjust the traveling speed in accordance with snow removal conditions. In such a case, the human operator can operate the engine in an optimal operating state if the human operator can know, during execution of each of the control modes, whether a current operating state of the engine is in an optimal operating range. In this way, optimal snow removal performance of the machine can be achieved.

In order to know whether the current operating state of the engine is in the optimal operating range, it is conceivable to provide an engine rotation meter. However, with mere provision of such an engine rotation meter, the human operator requires considerable experience or skill in order to judge whether the current operating state of the engine is optimal in the individual control modes.

Besides, if the engine is of a type provided with en electronic governor, a throttle is kept closed while the engine is in a no-load state even when the number of rotations of the engine is maximum (upper limit). Thus, in this case, whether the engine is in the optimal operating state can be known via the engine rotation meter only by the human operator first operating the engine, prior to snow removal work, so that the number of rotations of the engine reaches the maximum and then placing a load on the engine so that the number of rotations of the engine decreases.

SUMMARY

In view of the foregoing prior art problems, it is preferable to provide an improved technique which allows a human operator to readily recognize or identify, in each of a plurality of control modes, whether an operating state of an engine is in an optimal operating range.

Here, the present disclosure provides an improved snow removal machine in which an engine drives at least an auger and a blower for blowing snow, gathered by the auger, to around the machine through a shooter and which is self-propelled via a travel unit, the snow removal machine comprising: a mode switching operation section for selecting and switching to any one of a plurality of control modes differing from each other in engine output control characteristic; and a control section for controlling the engine by executing any one of the plurality of control modes in accordance with an operation signal output from the mode switching operation section. The control section makes a determination as to whether an operating state of the engine in the control mode currently executed by the control section is in a recommended operating range preset on the basis of at least a rotating speed and degree of throttle opening of the engine, and the control section issues an instruction to a display section such that the display section displays a result of the determination.

According to the present disclosure, the control section makes a determination as to whether the operating state of the engine in the control mode currently executed by the control section is in the recommended operating range, and the control section instructs the display section to visually display a result of the determination. Thus, in each of the control modes selected in accordance with an environment of snow removal work and preference of a human operator, the human operator can readily visually recognize or identify whether the operating state of the engine is in the recommended operating range, i.e. in an optimal operating range. Thus, the snow removal machine is readily and effectively allowed to operate the snow removal machine with optimal snow removal performance. Namely, by displaying the optimal operating range in each of the control modes desired by the human operator, the present disclosure can guide and prompt the human operator to perform appropriate operations so that the engine can always operate in the operating range.

Preferably, the snow removal machine of the present disclosure further comprises a speed lever for controlling a traveling speed of the travel unit. Upon determination that the operating state of the engine is outside the recommended operating range, the control section issues an instruction to the display section such that the display section makes a display prompting the human operator to operate the speed lever. Such a display feature of the present disclosure allows the human operator to operate the engine in the optimal operating range with an enhanced operability and is particularly best suited for a novice human operator of snow removal work.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 8 is a flow chart of a control flow executed by the control section shown in FIG. 6.

DETAILED DESCRIPTION

In the following description, the terms "front", "rear", "left", "right", "upward", "downward" etc. are used to refer to directions as viewed from a human operator operating a snow removal machine of the embodiments.

Embodiment 1

Figure 1:
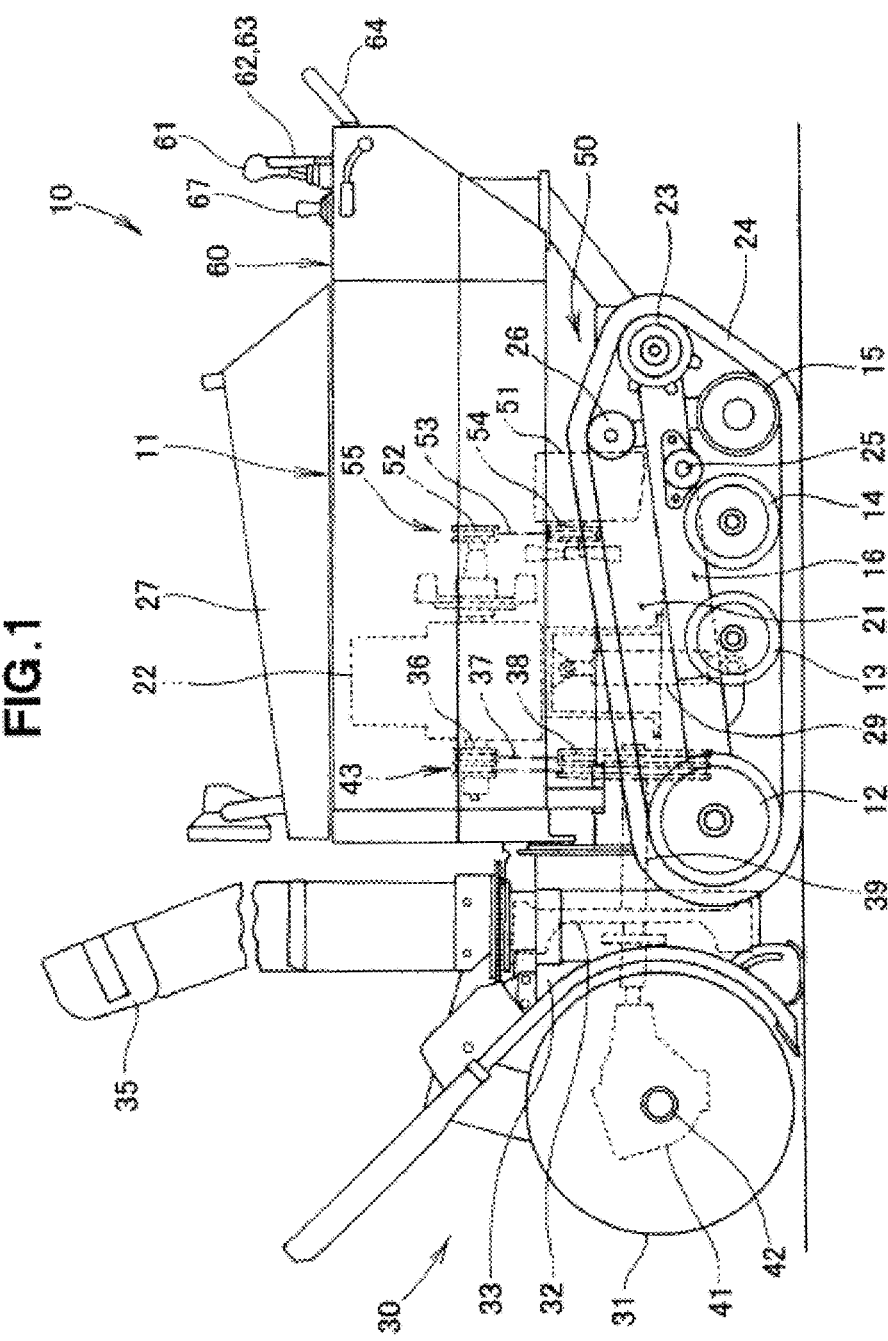
FIG. 1 is a side view of a first embodiment of a snow removal machine of the present invention.

A first embodiment of the snow removal machine 10 of the present invention will be described with reference to FIGS. 1 to 5. As shown in FIG. 1, the snow removal machine 10 is a working machine which is self-propelled via a travel unit 50 and in which an engine 22 drives at least an auger 31 and a blower 32 for blowing away snow, gathered by the auger 31, to around the machine 10 via a shooter 35.

More specifically, the snow removal machine 10 is a self-propelled vehicle where, on each of left and right sides thereof, an idle wheel 12 is rotatably mounted on a front portion of a crawler frame 16 of a machine body 11, three lower track rollers 13, 14 and 15 are rotatably mounted on a lower portion of the crawler frame 16, a machine body frame 21 is vertically pivotably connected to a rear portion of the crawler frame 16, a work unit 30 is mounted on a front portion of the machine body frame 21, the engine 22 is mounted on the machine body frame 21, and a drive wheel 23 is mounted on a rear portion of the crawler frame 16. Further, a crawler belt 24 is wound at its opposite end portions on the drive wheel 23 and the idle wheel 12, a pivot shaft 25 that connects the machine body frame 21 to the crawler frame 16 is disposed forward of the drive wheel 23, the rearmost lower track roller 15 is disposed below and between the pivot shaft 25 and the drive wheel 23, and an upper track roller 26 that supports the crawler belt 24 above and between the pivot shaft 25 and the drive wheel 23 is mounted on the crawler frame 16.

The engine 22 is covered with an engine cover 27, and an auger-height adjusting hydraulic cylinder 29 is provided beneath the engine 22.

The work unit 30 (snow removal section 30) includes, as its fundamental components, the auger 31, blower 32, auger housing 33 and shooter 35 to be driven by the engine 22. Motive power of the engine 22 is sequentially transmitted to a drive pulley 36, a belt 37, a driven pulley 38, a drive shaft 39, a gear case 41 and an auger shaft 42 in the order named. Thus, the auger 31 is rotated to gather snow on a road surface generally inwardly in a width direction of the snow removal machine (i.e., in a direction generally perpendicular to the sheet of FIG. 1) to thereby send the gathered snow to the blower 32, so that the snow can be thrown away through the shooter 35 by centrifugal force of the blower 32.

Namely, a power transmission system 43 for transmitting the motive power of the engine 22 to the auger 31 and the blower 32 as loads of the engine 22 includes the belt 37 wound at its opposite end portions on the drive pulley 36 and the driven pulley 38.

The travel unit 50 includes, as its fundamental components, a hydraulic continuously variable transmission 51, the idle wheel 12, the lower track rollers 13, 14 and 15, the drive wheel 23 and the crawler belt 24 that are driven by the engine 22. The motive power of the engine 22 is sequentially transmitted to the drive pulley 52, the belt 53, the driven pulley 54, the hydraulic continuously variable transmission 51 and the drive wheel 23 in the order named, so that the crawler belt 24 is rotated to allow the snow removal machine to travel on and along the road surface.

Namely, a power transmission system 55 for transmitting the motive power of the engine 22 to the crawler belt 24 as a load of the engine 22 includes a pair of the pulleys 52 and 54, and the belt 55 wound at its opposite end portions on the pulleys 52 and 54. An operation section 60 is provided on a rear portion of the machine body 11.

Figure 2:
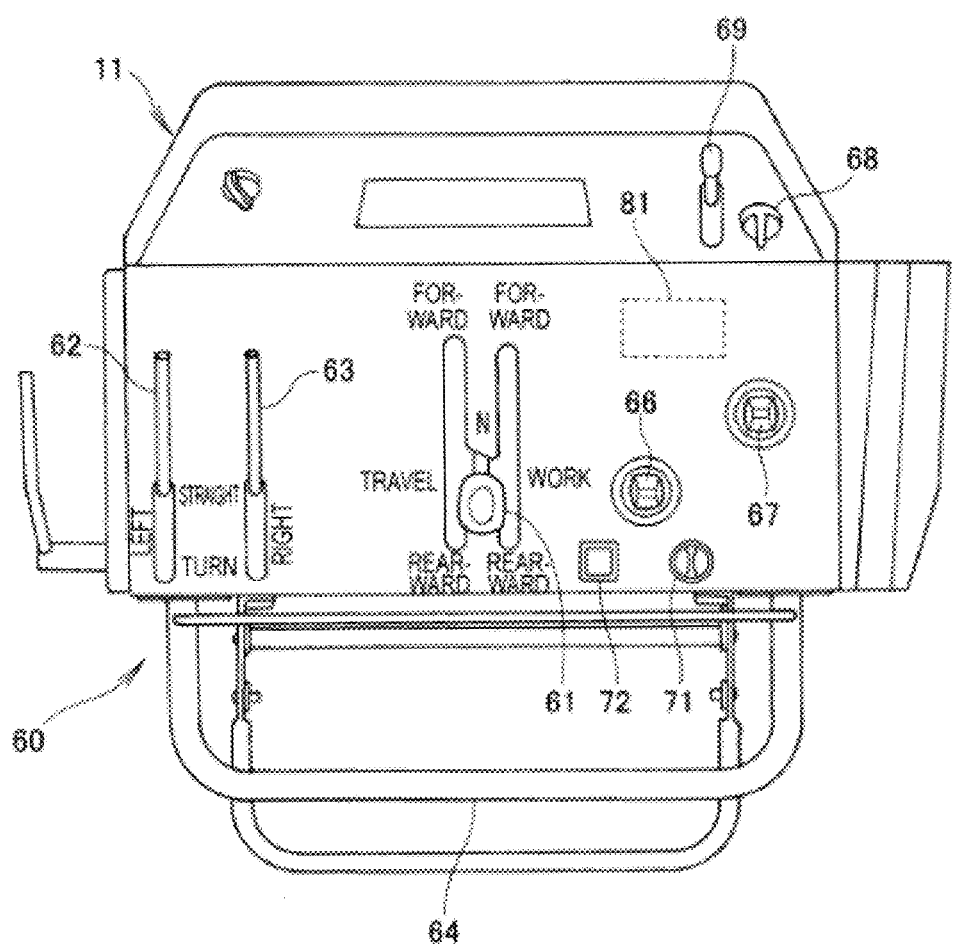
FIG. 2 is a plan view of an operation section shown in FIG. 1.

As shown in FIGS. 1 and 2, the operation section 60 includes a plurality of operation levers and operation knobs provided thereon. More specifically, a speed lever 61 (i.e., speed change lever 61) is provided centrally on the operation section 60. The speed lever 61 is an operation member for selecting between a travel state and a snow removal work state and for adjusting a forward traveling speed or a rearward traveling speed. Namely, the speed lever 61 is an operation member for controlling a traveling speed of the travel unit 50.

Further, two turning operation levers 62 and 63 for turning the machine body 11 in a leftward/rightward direction are provided to the left of the speed lever 61 on the operation section 60. When the two turning operation levers 62 and 63 are both in a forward pivoted (or tilted) position, the machine body 11 can travel straight forward. As the left turning operation lever 62 is tilted rearward, the machine body 11 turns left; similarly, as the right turning operation lever 63 is tilted rearward, the machine body 11 turns right. Namely, while the two turning operation levers 62 and 63 are both in the forward pivoted (or tilted) position, the drive wheel 23 is kept connected to the hydraulic continuously variable transmission 51 via clutches. As any one of the two turning operation levers 62 and 63 is pivoted (tilted) rearward, the clutch of the drive wheel 23 corresponding to the rearward-pivoted (tilted) turning operation lever 62 or 63 is disconnected so that the motive power is no longer transmitted to the drive wheel 23. During that time, the motive power continues to be transmitted to the other drive wheel 23 to cause the machine body 11 to turn left or right.

A clutch lever 64 having a generally U shape as viewed in top plan is vertically pivotably mounted on a rear portion of the operation section 60. This clutch lever 64 is an operation member for switching between ON and OFF states of a clutch (not shown) provided between the engine 22 and the travel unit 50 and work unit 30.

An auger housing posture control lever 66 and a shooter operation lever 67 are provided to the right of the speed lever 61 on the operation section 60. Via the auger housing posture control lever 66, the auger-height adjusting hydraulic cylinder 29 is operated to adjust a posture of the auger 31. Via the shooter operation lever 67, the shooter 35 is adjusted in orientation so as to adjust a throwing-away direction of snow gathered by the auger 31.

Further, on the operation section 60, a main switch 68 (engine switch 68) for switching between ON and OFF states of the engine 22 is provided in front of the shooter operation lever 67, and a throttle lever 69 for adjusting a degree of opening of a throttle valve 82 (see FIG. 3) is pivotally provided to the left of the engine switch 68.

Further, a mode switching operation section 71 and a display section 72 are provided on an upper portion of the operation section 60, and a control section 81 is provided in the operation section 60.

Figure 3:
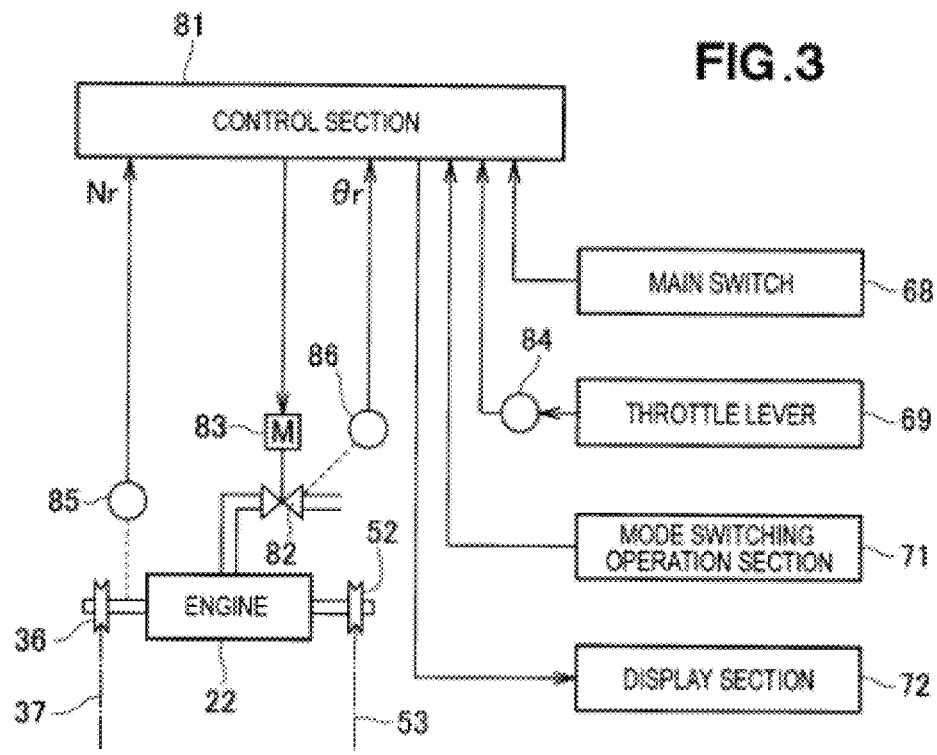
FIG. 3 is a schematic diagram explanatory of an engine control system implemented by a control section shown in FIG. 2.

Referring now to FIG. 3, the mode switching operation section 71 is a manual switch, such as a rotary switch, for selecting and switching to any one of a plurality of control modes differing from each other in engine output control characteristic. The plurality of control modes are, for example, a first control mode and a second control mode.

The control section 81 controls the engine 22 by executing any one of the plurality of control modes, e.g. first and second control modes, in accordance with an operation signal of the mode switching operation section 71. The display section 72, which comprises for example display lamps, displays engine information in response to an instruction received from the control section 81.

Opening/closing of the throttle valve 82 for the engine 22 is controlled by the control section 81 controlling a control motor 83 of an electronic governor (also referred to as electric governor) in accordance with a human operator's operation of the throttle lever 69. The throttle lever 69 can be reciprocated with a hand of the human operator so that a voltage corresponding to a position of the throttle lever 69 is generated by a potentiometer 84. The throttle valve 82 can be closed to a fully-closed position by the throttle lever 69 being pivoted rearward by the human operator, and the throttle valve 82 can be opened to a fully-opened position by the throttle lever 69 being pivoted forward by the human operator. Thus, a rotating speed of the engine 22 can be adjusted.

An actual rotating speed Nr of the engine 22 is detected by an engine rotation sensor 85, and the engine rotation sensor 85 issues a detection signal, indicative of the detected actual rotating speed, to the control section 81. An actual degree of opening θr of the throttle valve 82 (degree of throttle opening θr) is detected by a throttle opening sensor 86, and the throttle opening sensor 86 issues a detection signal, indicative of the detected degree of throttle opening θr, to the control section 81.

Figure 4:
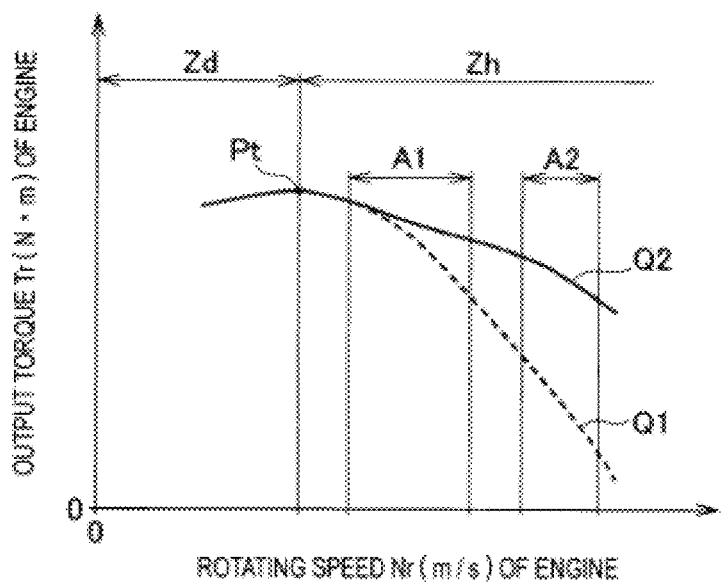
FIG. 4 is a conceptual diagram explanatory of engine control modes executed by the control section shown in FIG. 3.

The following outline, with reference to FIG. 4, the first and second control modes executed by the control section 81. FIG. 4 is an engine characteristic diagram showing a characteristic of output torque Tr of the engine 22 versus the actual rotating speed Nr, where the vertical axis represents the output torque Tr while the horizontal axis represents the rotating speed Nr of the engine 22.

In FIG. 4, a generally mountain-shaped broken-line curve is a first engine output characteristic curve Q1, and a generally mountain-shaped solid-line curve is a second engine output characteristic curve Q2. The first engine output characteristic curve Q1 and the second engine output characteristic curve Q2 substantially coincide with each other at their maximum torque point Pt. The first engine output characteristic curve Q1 and the second engine output characteristic curve Q2 superpose on each other in a low speed region Zd lower than the maximum torque point Pt (i.e., region to the left of the maximum torque point Pt), and the first engine output characteristic curve Q1 and the second engine output characteristic curve Q2 present different characteristics in a high speed region Zh that is higher than the maximum torque point Pt (i.e., region to the right of the maximum torque point Pt).

The first engine output characteristic curve Q1 is characterized by representing a characteristic having a strong tendency that the output torque Tr decreases as the rotating speed Nr increases, i.e. a characteristic that a variation of the output torque Tr responsive to a variation of the rotating speed Nr (i.e., torque variation ratio) is great, in the high speed region Zh. In other words, according to the first engine output characteristic curve Q1, the output torque Tr greatly increases as the rotating speed Nr of the engine 22 decreases in the high speed region Zh. Because of such a great torque variation ratio, there can be obtained a so-called "tenacious" characteristic that allows an engine stall to be less likely occur. Such a characteristic can be achieved, for example, by the control section 81 controlling the characteristic of the electronic governor and degree of throttle opening.

Generally, in the auger-type snow removal machine 10, load torque of the snow removal section 30 would greatly vary in accordance with a changing traveling speed even if a height and quality of accumulated snow are uniform. However, even when the load torque of the snow removal section 30 driven by the engine 22 operating in the high speed region Zh has rapidly increased, the use of the first engine output characteristic curve Q1 can prevent the rotating speed Nr of the engine 22 from decreasing rapidly in response to the rapid load torque increase. Besides, the user of the first engine output characteristic curve Q1 allows the rotating speed Nr of the engine 22 to return to an original speed as the load torque decreases.

As the rotating speed Nr of the engine 22 decreases, the traveling speed of the travel unit 50 driven by the engine 22 too decreases, in response to which the load torque of the snow removal section 30 decreases and thus an amount of snow removal by the snow removal section 30 decreases. Thus, followability of a variation of the traveling speed to a variation of the load torque of the snow removal section 30 is high. Therefore, the human operator need not excessively care about occurrence of an engine stall. Because the human operator does not have to frequently operate the speed lever 61, human operator's operations can be simplified. Besides, because snow removal work can be performed quickly, an enhanced working efficiency can be achieved. Particularly, the first engine output characteristic curve Q1 is suited for a novice human operator unexperienced in snow removal work, as well as for cases where snow gathered by the auger 31 need not be blown far away, i.e. where a snow throwing distance may be short.

The second engine output characteristic curve Q2 is characterized by representing a characteristic whose tendency that the "output torque Tr decreases as the rotating speed Nr increases" is weak as compared to the characteristic of the first engine output characteristic curve Q1, i.e. a characteristic that a variation of the output torque Tr responsive to a variation of the rotating speed Nr (i.e., torque variation ratio) is small, in the high speed region Zh. In other words, according to the second engine output characteristic curve Q2, the output torque Tr increases slowly, without greatly varying, even if the rotating speed Nr of the engine 22 decreases, in the high speed region Zh. Namely, an inclination of the torque variation ratio in the high speed region Zh is gentler than that of the first engine output characteristic curve Q1.

According to the characteristic represented by the second engine output characteristic curve Q2, the output torque Tr is greater than that of the first engine output characteristic curve Q1, and the torque variation ratio is smaller than that of the first engine output characteristic curve Q1. Thus, the rotating speed Nr to obtain desired output torque Nr is kept high. Because great output torque Tr can be obtained without the rotating speed Nr lowering, this second engine output characteristic curve Q2 is suited for cases where gathered snow is to be thrown far away over a long distance, and thus can be suitably used by an experienced human operator. Additionally, because the increased snow-throwing distance allows snow removal work to be performed at an increased speed, the operating efficiency can be significantly enhanced. The second engine output characteristic curve Q2 is particularly useful in cases where accumulated snow is freshly-fallen snow.

The above-mentioned "first control mode" is a so-called "torque rise mode" in which the engine 22 is controlled in accordance with the engine output control characteristic of the first engine output characteristic curve Q1. Further, the above-mentioned "second control mode" is a so-called "power mode" in which the engine 22 is controlled in accordance with the engine output control characteristic of the second engine output characteristic curve Q2.

In the first control mode, a first recommended operating range A1 is set in the characteristic of the first engine output characteristic curve Q1, as shown in FIG. 4. In the second control mode, a second recommended operating range A2 is set in the characteristic of the second engine output characteristic curve Q2, as shown in FIG. 4. These first and second recommended operating ranges A1 and A2 serve as criteria for evaluating or judging whether an operating state (particularly in the high speed region) of the engine 11 is in an optimal operating range for driving the auger 31 and the blower 32.

The first and second recommended operating ranges A1 and A2 are preset on the basis of at least the rotating speed Nr and degree of throttle opening θr of the engine 22 and particularly in such a manner that they can become optimal ranges in the high speed region Zh. The degree of throttle opening θr when the operating state of the engine 22 is in the first or second recommended operating range A1 or A2 is very close to the degree corresponding to the "fully opened" position of the throttle valve 82. The first recommended operating range A1 is set at a rotating speed range near the maximum torque point Pt in the first engine output characteristic curve Q1. The second recommended operating range A2 is set at a rotating speed range remote from the maximum torque point Pt in the second engine output characteristic curve Q2.

Next, with reference to FIG. 5 as well as FIGS. 3 and 4, a description will be given about an example control flow executed by the control section 81 that is implemented by a microcomputer. This control flow is started up upon turning-on of the main switch 68 and terminated upon turning-off of the main switch 68. Note that the control flow chart shown in FIG. 5 is explanatory only of step operations related to engine control with other step operations omitted.

Figure 5:
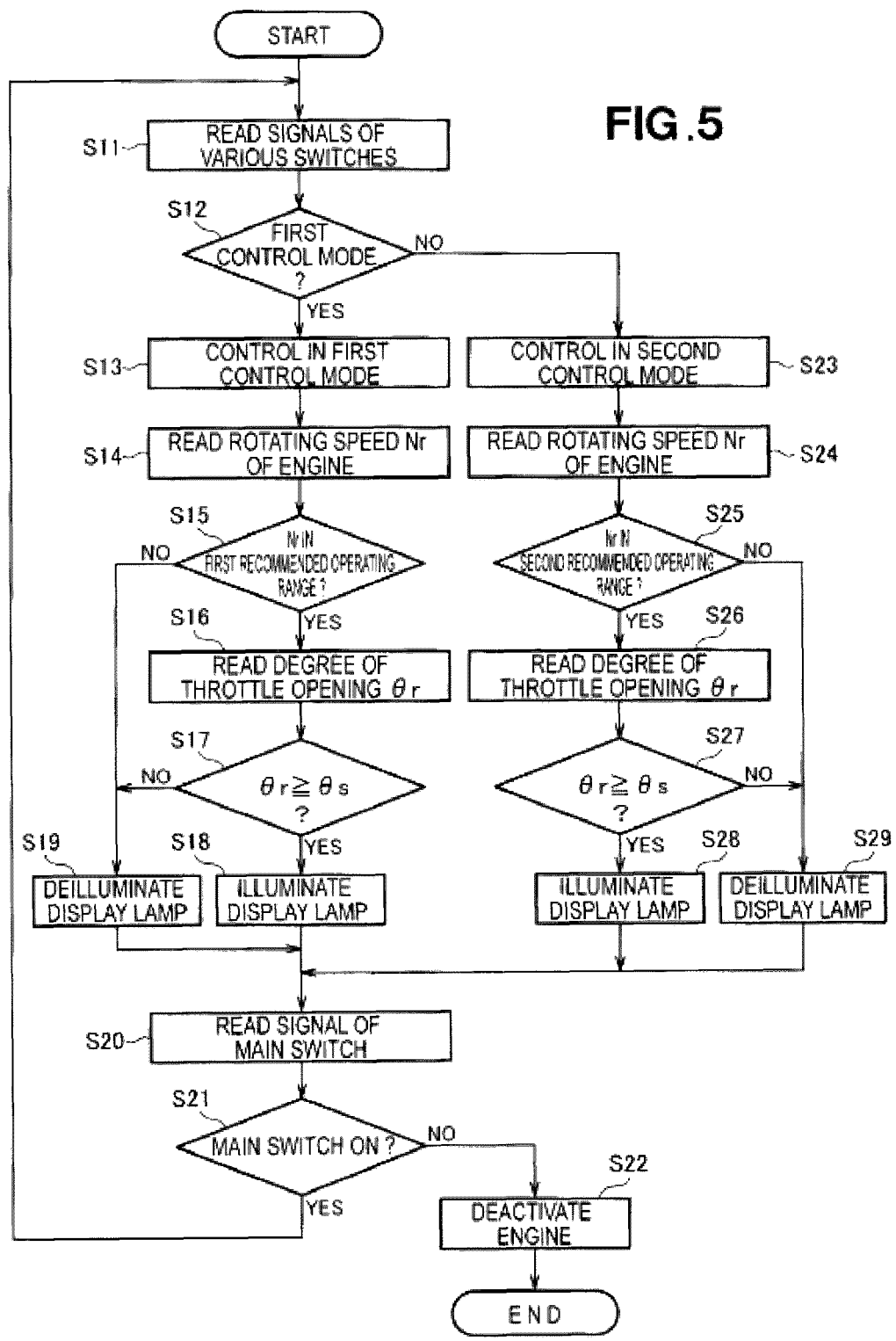
FIG. 5 is a flow chart of a control flow executed by the control section shown in FIG. 3.

FIG. 5 is a flow chart of the control flow executed by the control section 81 in the first embodiment of the present invention. At first step S11, the control section 81 reads switch signals of various switches. Then, at step S12, the control section 81 makes a determination as to whether the mode switching operation section 71 has been switched to the first control mode, i.e. whether the current control mode of the engine 22 is the first control mode. If the mode switching operation section 71 has been switched to the first control mode as determined at step S12, the control flow proceeds to step S13.

At step S13, the engine 22 is controlled in the first control mode that uses the characteristic of the first engine output characteristic curve Q1 shown in FIG. 4. Then, at step S14, the control section 81 reads a current rotating speed Nr. For this purpose, the control section 81 may read a value detected by the engine rotation sensor 85.

Then, at step S15, the control section 81 makes a determination as to whether the read rotating speed Nr is in the first recommended operating range A1. If the read rotating speed Nr is in the first recommended operating range A1 as determined at step S15, the control flow proceeds to step S16, where the control section 81 reads a current degree of throttle opening θr. For this purpose, the control section 81 may read a value detected by the throttle opening sensor 86.

At next step S17, the control section 81 makes a determination as to whether the read degree of throttle opening θr has reached at least a target degree of throttle opening θs, i.e. θr≧θs. If answered in the affirmative at step S17, the control section 81 issues an illumination instruction to the display section 72 (display lamp 72), at step S18. By being illuminated in response to the illumination instruction, the display section 72 notifies that the read rotating speed Nr is in the first recommended operating range A1. By viewing the illuminated display section 72, the human operator determines that the current operating state of the engine 22 is in the first recommended operating range A1 and maintains the current operating state.

If, on the other hand, the read rotating speed Nr is outside (not in) the first recommended operating range A1 as determined at step S15, or the read degree of throttle opening θr has not yet reached the target degree of throttle opening θs, i.e. θr<θs, as determined at step S17, the control section 81 issues a deillumination instruction to the display section 72 at step S19. Namely, the control section 81 instructs the display section 72 to make a display prompting the human operator to operate the speed lever 61. Deillumination of the display section 72 notifies that the rotating speed Nr is outside (not in) the first recommended operating range A1, and it prompts the human operator to operate the speed lever 61. By viewing the deilluminated display section 72, the human operator determines that the current operating state of the engine 22 is outside the first recommended operating range A1 and then appropriately operates the speed lever 61 so that the operating state of the engine 22 falls in the first recommended operating range A1. Such an arrangement can enhance operability with which the human operator operates the engine 22 in an optimal operating range (i.e., allows the human operator to operate the engine 22 in the optimal operating range with an enhanced operability) and is particularly best suited for a novice human operator unexperienced in snow removal work.

Following step S18 or S19, the control section 81 reads a switch signal of the main switch at step S20. Then, at step S21, the control section 81 makes a determination as to whether or not to terminate the control flow. Namely, if the main switch 68 is ON, the control section 81 determines that the control flow should continue, and then it reverts to step S11. If the main switch 68 is OFF, the control section 81 determines that the control flow should be terminated and then deactivates the engine 22 at step S22, after which the control section 81 terminates the control flow.

If the current mode of the engine 22 is not the first control mode as determined at step S12, i.e. if the mode switching operation section 71 has been switched to the second control mode as determined at step S12, the control flow branches to step S23.

At step S23, the engine 22 is controlled in the second control mode that uses the characteristic of the second engine output characteristic curve Q2 shown in FIG. 4. Then, at step S24, the control section 81 reads a current rotating speed Nr of the engine 22. For this purpose, the control section 81 may read a value detected by the engine rotation sensor 85.

Then, at step S25, the control section 81 makes a determination as to whether the read rotating speed Nr is in the second recommended operating range A2. If the read rotating speed Nr is in the second recommended operating range A2 as determined at step S25, the control flow proceeds to step S26, where the control section 81 reads a current degree of opening θr of the throttle valve 82 (throttle opening θr). For this purpose, the control section 81 may read a value detected by the throttle opening sensor 86.

At next step S27, the control section 81 makes a determination as to whether the read degree of throttle opening θr has reached at least the target degree of throttle opening θs, i.e. θr≥θs. If answered in the affirmative at step S27, the control section 81 issues an illumination instruction to the display section 72, at step S28. Illumination of the display section 72 notifies that the read rotating speed Nr is in the second recommended operating range A2.

If, on the other hand, the read rotating speed Nr is outside (not in) the second recommended operating range A2 as determined at step S25, or the read degree of throttle opening θr has not yet reached the target degree of throttle opening θs, i.e. θr<θs, as determined at step S27, the control section 81 issues a deillumination instruction to the display section 72 and then proceeds to step S20. Namely, the control section 81 instructs the display section 72 to make a display prompting the human operator to operate the speed lever 61. By viewing the deilluminated display section 72, the human operator determines that the current operating state of the engine 22 is outside the second recommended operating range A2 and then appropriately operates the speed lever 61 so that the operating state of the engine 22 falls in the second recommended operating range A2. Such an arrangement can enhance operability with which the human operator operates the engine 22 in the optimal range and is particularly optimal to a novice human operator unexperienced in snow removal work.

According to the first embodiment of the present invention, as clear from the forgoing, the control section 81 makes a determination as to whether the operating state of the engine 22 in the currently-executed control mode is in the first or second recommended operating range A1 or A2, and the control section 81 displays a result of the determination on the display section 72. Thus, in each of the first and second control modes selected in accordance with an environment of snow removal work and preference of the human operator, the human operator can readily visually identify whether the current operating state of the engine 22 is in the recommended operating range A1 or A2, i.e. in the optimal operating range. Thus, the snow removal machine 10 is readily and effectively allowed to operate with optimal snow removal performance. Namely, by displaying the optimal operating range in each control mode desired by the human operator, the instant embodiment can guide and prompt the human operator to perform appropriate operations.

Embodiment 2

A second embodiment of the snow removal machine 10A of the present invention will be described with reference to FIGS. 6 to 8, of which FIG. 6 corresponds to FIG. 2, FIG. 7 corresponds to FIG. 4 and FIG. 8 corresponds to FIG. 5.

The second embodiment of the snow removal machine 10A is characterized by the following two modifications, but is otherwise similar to the arrangements shown in FIGS. 1 to 5 in relation to the first embodiment of the snow removal machine 10. The first modification is that the display section 72 shown in FIGS. 2 and 3 is replaced with a display section 72A shown in FIG. 6. The control modes and control flow of the control section 81 shown in FIGS. 4 and 5 are replaced with control modes and control flow of the control section 81 shown in FIGS. 7 and 8.

Figure 6:
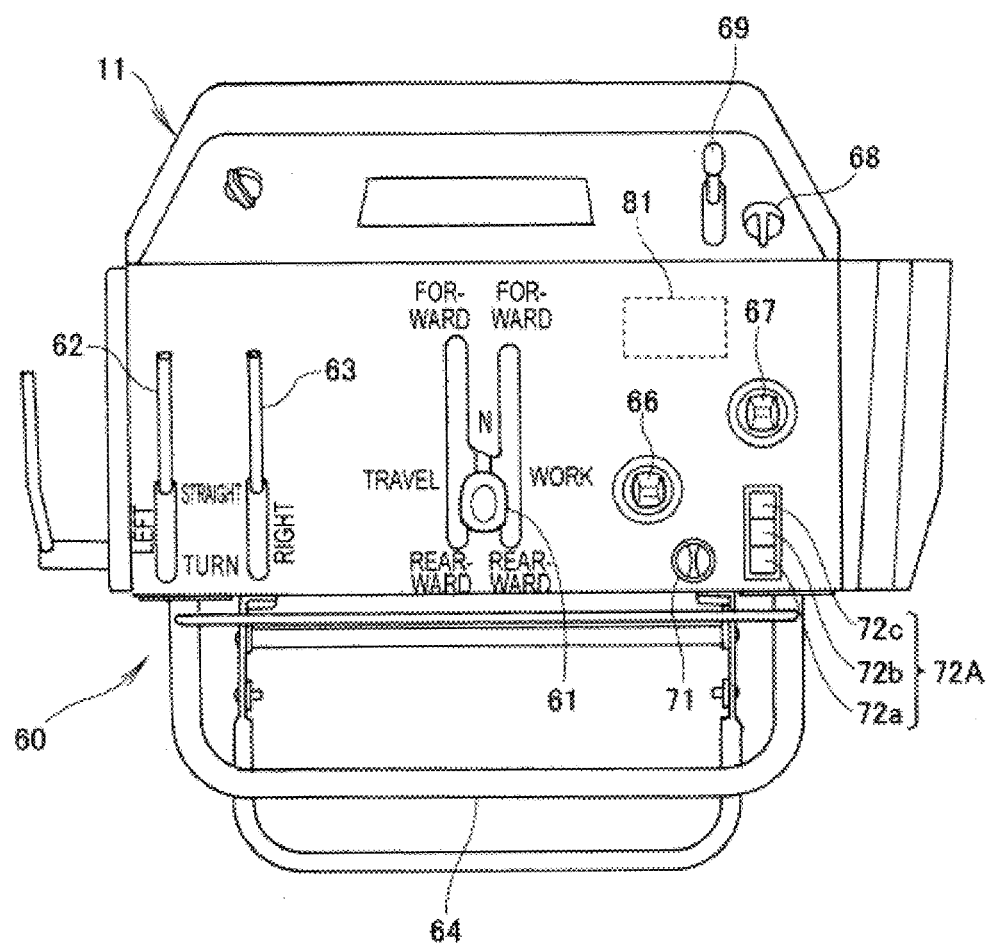
FIG. 6 is a plan view of an operation section in a second embodiment of the snow removal machine of the present invention.

More specifically, as shown in FIG. 6, the display section 72A provided on an upper portion of the operation section 60 comprises three displays 72a, 72b and 72c that are in the form of display lamps capable of displaying engine information independently of one another.

Figure 7A:
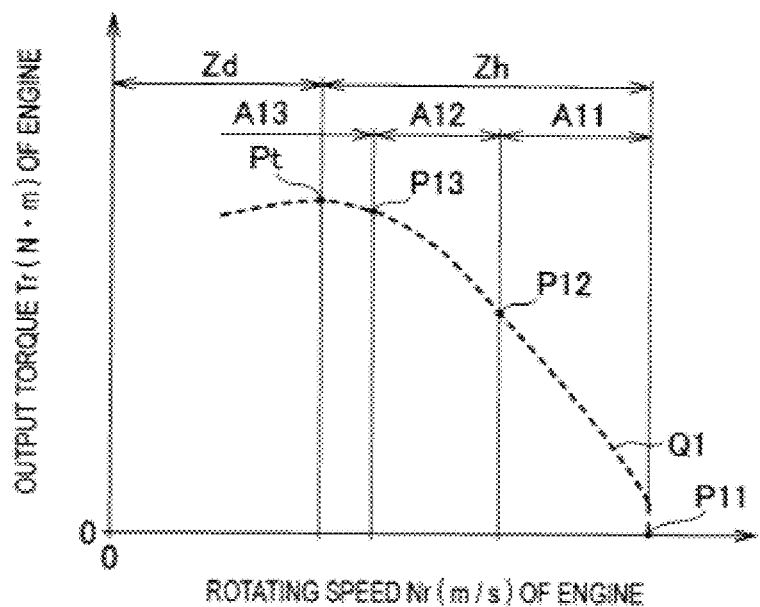
FIGS. 7A and 7B are diagrams conceptually showing engine control modes executed by a control section shown in FIG. 6.
Figure 7B:
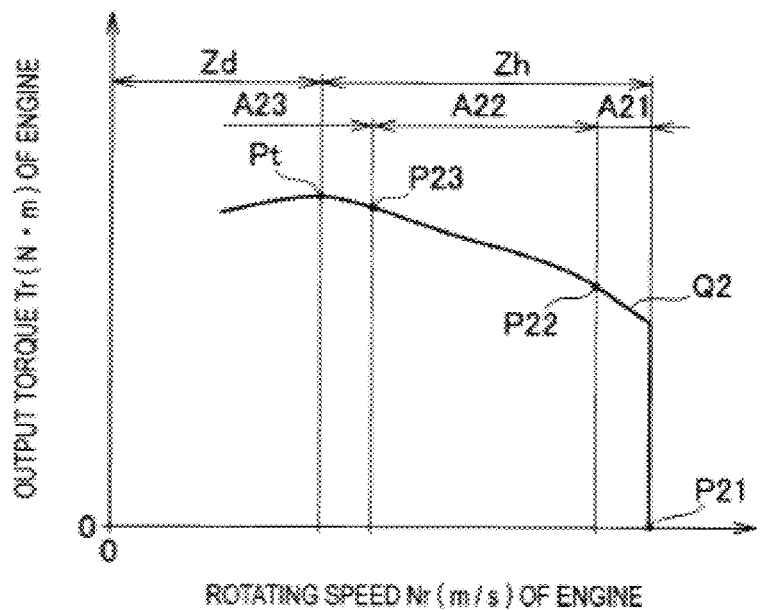

FIG. 7A conceptually shows the first control mode executed by the control section 81, which uses the same first engine output characteristic curve Q1 as shown in FIG. 4. FIG. 7B conceptually shows the second control mode executed by the control section 81, which uses the same second engine output characteristic curve Q2 as shown in FIG. 4.

According to the characteristic of the first engine output characteristic curve Q1 used in the first control mode in the second embodiment, the rotating speed Nr is maximum when the output torque Tr of the engine 22 is zero (i.e., in a no-load state), and a point of such a maximum rotating speed Nr will hereinafter be referred to as "non-load time point P11". Further, a point P12 of a maximum rotating speed which is near the non-load time point P11 in the high speed regions Zh and at which the engine 22 can operate in a stable, optimal manner will hereinafter be referred to as "maximum stable rotation point P12". Further, a point P13 of a minimum rotating speed which is near the maximum torque point Pt in the high speed region Zh and at which the engine 22 can operate in a stable, optimal manner will hereinafter be referred to as "minimum stable rotation point P13".

A range A11 from the non-load time point P11 to the maximum stable rotation point P12 is set as a "leeway operating range A11". In this leeway operating range (i.e., well-under-limit operating range) A1, there is leeway in the output torque Tr of the engine 22. Therefore, it is possible to increase load torque of snow removal by increasing the traveling speed of the snow removal machine 10A.

A range A12 from the maximum stable rotation point P12 to the stable minimum rotation point P13 is set as "optimal operating range A12". This optimal operating range A12 serves as a criterion for judging or determining whether the engine 22 is in the optimal operating range, i.e. the recommended operating range, for driving the auger 31 and the blower 32. The electronic governor constantly performs throttle opening degree control starting at the non-load time point P11. A point for fully opening the throttle valve 82 is in the optimal operating range A12. The optimal operating range A12 corresponds to the "first recommended operating range" employed in the first embodiment and has substantially the same advantageous benefits as the first recommended operating range.

A range A13 lower in speed than the stable minimum rotation point P13 is set as an "excessive load range A13". In this excessive load range A13, the load torque of snow removal is excessive, and thus, it is necessary to lower the traveling speed of the snow removal machine 10A.

Namely, in the characteristic of the first engine output characteristic curve Q1, an entire range of the rotating speed Nr where the engine 22 is rotatable, i.e. a "first operating range", is segmented into three ranges, i.e. the leeway operating range (well-under-limit operating range) A11, optimal operating range A12 and excessive load range A13.

In the second control mode in the second embodiment, an entire range of the rotating speed Nr where the engine 22 is rotatable, i.e. a "second operating range", is segmented into three ranges, i.e. a leeway operating range A21, optimal operating range A22 and excessive load range A3 as in the first control mode.

According to the characteristic of the second engine output characteristic curve Q2 used in the second control mode in the second embodiment, the rotating speed Nr is maximum when the output torque Tr of the engine 22 is zero (i.e., in a no-load state), and a point of such a maximum rotating speed Nr will hereinafter be referred to as "non-load time point P21". Further, a point P22 of a maximum rotating speed which is near the non-load time point P21 in the high speed region Zh and at which the engine 22 can operate in a stable, optimal manner will hereinafter be referred to as "maximum stable rotation point P22". Further, a point P33 of a minimum rotating speed which is near the maximum torque point Pt in the high speed region Zh and at which the engine 22 can operate in a stable, optimal manner will hereinafter be referred to as "minimum stable rotation point P23".

A range A21 from the non-load time point P21 to the maximum stable rotation point P22 is set as a "leeway operating range A2". In this leeway operating range A2, there is leeway in the output torque Tr of the engine 22.

A range A22 from the maximum stable rotation point P22 to the stable minimum rotation point P23 is set as "optimal operating range A22". This optimal operating range A22 serves as a criterion for determining whether the engine 22 is in the optimal operating range, i.e. the recommended operating range, for driving the auger 31 and the blower 32. The optimal operating range A22 corresponds to the "first recommended operating range" employed in the first embodiment and has substantially the same advantageous benefits as the first recommended operating range.

A range A23 lower in speed than the stable minimum rotation point P23 is set as an "excessive load range A23". In this excessive load range A23, the load torque of snow removal is excessive, and thus, it is necessary to lower the traveling speed of the snow removal machine 10A.

FIG. 8 is a flow chart of a control flow executed by the control section 81 in the second embodiment. At first step S111, the control section 81 reads switch signals of various switches. Then, at step S112, the control section 81 makes a determination as to whether the mode switching operation section 71 has been switched to the first control mode, i.e. whether the current control mode of the engine 22 is the first control mode. If the mode switching operation section 71 has been switched to the first control mode as determined at step S112, the control flow proceeds to step S113.

At step S113, the engine 22 is controlled in the first control mode that uses the characteristic of the first engine output characteristic curve Q1 shown in FIG. 7A. Then, at step S114, the control section 81 reads a current rotating speed Nr. For this purpose, the control section 81 may read a value detected by the engine rotation sensor 85.

Then, at step S115, the control section 81 makes a determination as to where in the first operating range the current rotating speed Nr falls. If the current rotating speed Nr falls in the leeway operating range A11 as determined at step S115, the control section 81 issues an illumination instruction to the first display 72a at step S116. By being illuminated in response to the illumination instruction, the first display 72a notifies that the read rotating speed Nr is in the leeway operating range A11.

If the current rotating speed Nr falls in the optimal operating range A12 as determined at step S115, the control section 81 issues an illumination instruction to the second display 72b at step S117. By being illuminated in response to the illumination instruction, the second display 72b notifies that the read rotating speed Nr is in the optimal operating range A12 (first recommended operating range A12).

Further, if the current rotating speed Nr falls in the excessive load range A13 as determined at step S115, the control section 81 issues an illumination instruction to the third display 72c at step S118. By being illuminated in response to the illumination instruction, the third display 72c notifies that the read rotating speed Nr is in the excessive load range A13.

Following execution of any one of steps S116 to S118, the control section 81 reads a switch signal of the main switch 68 at step S119. Then, at step S120, the control section 81 makes a determination as to whether or not to terminate the control flow. Namely, if the main switch 68 is currently ON, the control section 81 determines that the control should continue, and thus, it reverts to step S111. If, on the other hand, the main switch 68 is currently OFF, the control section 81 determines that the control should be terminated and thus deactivates the engine 22 at step S121 to thereby terminate the control flow.

If the current control mode is not the first mode, i.e. if the mode switching operation section 71 has been switched to the second control mode as determined at step S112, the control flow proceeds to step S122.

At step S122, the engine 22 is controlled in the second control mode that uses the characteristic of the second engine output characteristic curve Q2 shown in FIG. 7B. Then, at step S123, the control section 81 reads a current rotating speed Nr of the engine 22. For this purpose, the control section 81 may read a value detected by the engine rotation sensor 85.

Then, at step S124, the control section 81 makes a determination as to where in the second operating range the current rotating speed Nr falls. If the current rotating speed Nr falls in the leeway operating range A21 as determined at step S124, the control section 81 issues an illumination instruction to the first display 72a at step S125. By being illuminated in response to the illumination instruction, the first display 72a notifies that the read rotating speed Nr is in the leeway operating range A21.

If the current rotating speed Nr falls in the optimal operating range A22 as determined at step S124, the control section 81 issues an illumination instruction to the second display 72b at step S126. By being illuminated in response to the illumination instruction, the second display 72b notifies that the read rotating speed Nr is in the optimal operating range A22 (second recommended operating range A22).

If the current rotating speed Nr falls in the excessive load range A23 as determined at step S124, the control section 81 issues an illumination instruction to the third display 72c at step S127. By being illuminated in response to the illumination instruction, the third display 72c notifies that the read rotating speed Nr is in the excessive load range A23.

Following execution of any one of steps S125 to S127, the control section 81 proceeds to step S119 above.

According to the second embodiment, as clear from the forgoing, the control section 81 makes a determination as to whether the operating state of the engine 22 in the currently-executed control mode is in the recommended operating range A12 or A22, and the control section 81 displays a result of the determination on the display section 72A. Thus, in each of the first and second control modes selected in accordance with an environment of snow removal work and preference of the human operator, the human operator can readily visually identify whether the current operating state of the engine 22 is in the recommended operating range A12 or A22, i.e. in the optimal operating range. Thus, the snow removal machine 10 is readily and effectively allowed to operate with optimal snow removal performance. Namely, by displaying the optimal operating range in each control mode desired by the human operator, the instant embodiment can guide and prompt the human operator to perform appropriate operations.

Further, according to the second embodiment, the display section 72A in each of the plurality of control modes can more finely display the current operating state of the engine 22 in any one of the three segmented ranges, i.e. optimal operating range A11, recommended operating range A12 and excessive load range A13. Thus, the human operator can visually identify, clearly and more finely, the operating state of the engine 22. As a result, the human operator can clearly know whether the speed lever 61 should be operated in the accelerating direction or in the decelerating direction, and thus, the human operator can appropriately operate the speed lever 61 with an increased ease.

For example, when the current operating state of the engine 22 is not in the optimal operating state, the human operator can also clearly identify whether the current operating state of the engine 22 is in the leeway operating state or excessive load state, by viewing the display section 72A. In this way, the human operator can readily and clearly know whether the speed lever 61 should be operated in the accelerating direction or in the decelerating direction, in order to achieve the optimal operating state of the engine 22. Thus, efficient snow removal work can be performed even where the human operator is not sufficiently experienced or skilled.

Embodiment 3

A third embodiment of the snow removal machine 10B of the present invention will be described with reference to FIG. 9 that corresponds to FIG. 8. The third embodiment of the snow removal machine 10B is characterized by the following two modifications. The first modification is that the display section 72A of the second embodiment shown in FIG. 6 is replaced with the display section 72 shown in FIG. 2, and the second modification is that the control flow of the second embodiment shown in FIG. 8 is replaced with a control flow shown in FIG. 9.

Figure 9:
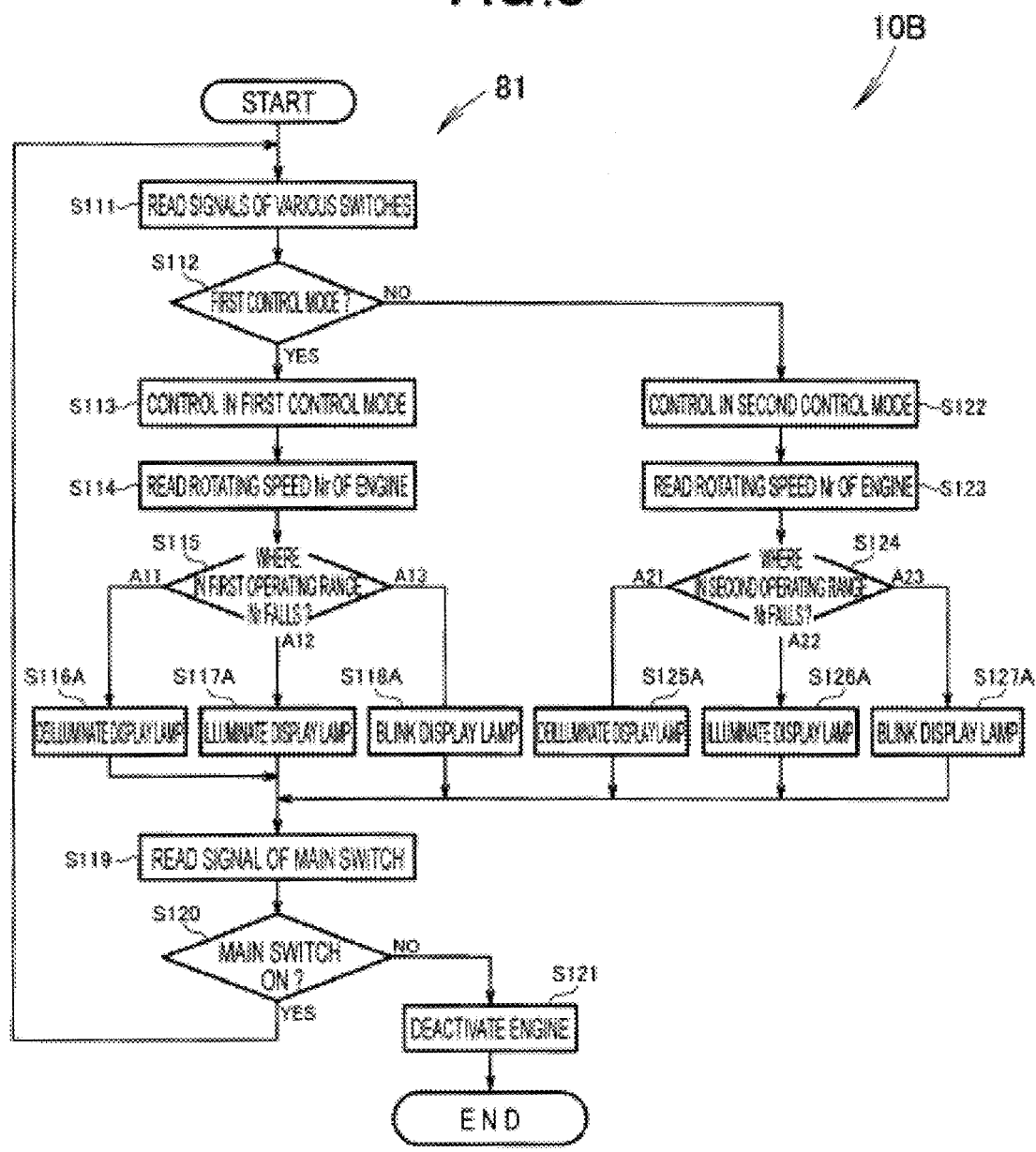
FIG. 9 is a flow chart of a control flow executed by a control section in a third embodiment of the snow removal machine of the present invention.

More specifically, in the control flow shown in FIG. 9, steps S116A, S117A and S118A correspond to steps S116, S117 and S118, respectively, of FIG. 8. Further, steps S125A, S126A and S127A of FIG. 9 corresponds to steps S125, S126 and S127, respectively, of FIG. 8, and the other steps of FIG. 9 are similar in content to corresponding steps of FIG. 8.

If the current rotating speed Nr falls in the leeway operating range A11 as determined at step S115, the control section 81 issues a deillumination instruction to the display section (display lamp) 72 at step S116A. By being deilluminated in response to the deillumination instruction, the display section 72 notifies that the read rotating speed Nr is in the leeway operating range A11.

If the current rotating speed Nr falls in the optimal operating range A12 as determined at step S115, the control section 81 issues an illumination instruction to the display section 72 at step S117A. By being illuminated in response to the illumination instruction, the display section 72 notifies that the read rotating speed Nr is in the optimal operating range A12 (first recommended operating range A12).

Further, if the current rotating speed Nr falls in the excessive load range A13 as determined at step S115, the control section 81 issues a blink instruction to the display section 72 at step S118A. By blinking in response to the blink instruction, the display section 72 notifies that the read rotating speed Nr is in the excessive load range A13.

Further, if the current rotating speed Nr falls in the leeway operating range A21 as determined at step S124, the control section 81 issues a deillumination instruction to the display section 72 at step S125A. By being deilluminated in response to the deillumination instruction, the display section 72 notifies that the read rotating speed Nr is in the leeway operating range A21.

Further, if the current rotating speed Nr falls in the optimal operating range A22 as determined at step S124, the control section 81 issues an illumination instruction to the display section 72 at step S126A. By being illuminated in response to the illumination instruction, the display section 72 notifies that the read rotating speed Nr is in the optimal operating range A22 (second recommended operating range A22).

Furthermore, if the current rotating speed Nr falls in the excessive load range A23 as determined at step S124, the control section 81 issues a blink instruction to the display section 72 at step S128A. By blinking in response to the blink instruction, the display section 72 notifies that the read rotating speed Nr is in the excessive load range A23.

The third embodiment can achieve substantially the same behavior and advantageous benefits as the above-described second embodiment, and the third embodiment can be simplified in displaying construction as compared to the second embodiment because three different kinds of displays are made by the single display section 72 in the third embodiment.

Note that the present disclosure is also applicable to snow removal machines constructed in such a manner that the auger 31 and the blower 32 are driven by the engine 22 while the travel unit 55 is driven by an electric motor.

It should be appreciated that the basic principles of the present invention are well suited for application to snow removal machines where at least an auger is driven by an engine. Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is to be interpreted by the appended claims rather than by the foregoing description.

What is claimed is:

1. A snow removal machine in which an engine drives at least an auger and a blower for blowing snow, gathered by the auger, to around the machine through a shooter and which is self-propelled via a travel unit, the snow removal machine comprising a mode switching operation section for selecting and switching to any one of a plurality of control modes differing from each other in engine output control characteristic;

a control section for controlling the engine by executing any one of the plurality of control modes in accordance with an operation signal output from the mode switching operation section; and a speed lever for controlling a traveling speed of the travel unit, wherein the control section makes a determination as to whether an operating state of the engine in the control mode currently executed by the control section is in a recommended operating range preset on a basis of at least a rotating speed and degree of throttle opening of the engine, and the control section issues an instruction to a display section such that the display section displays a result of the determination, and wherein, upon determination that the operating state of the engine is outside the recommended operating range, the control section issues an instruction to the display section such that the display section makes a display prompting a human operator to operate the speed lever.

2. The snow removal machine according to claim 1, wherein the plurality of control modes differ from each other in the recommended operating range.

3. The snow removal machine according to claim 1, wherein the engine output control characteristic is defined by an output torque of the engine and a rotating speed of the engine.

\* \* \* \* \*